United States Patent [19]
Numazawa et al.

[11] Patent Number: 5,955,512
[45] Date of Patent: Sep. 21, 1999

[54] PRESSURE SENSITIVE ADHESIVE COMPOSITION AND SHEET HAVING LAYER THEREOF

[75] Inventors: Hideki Numazawa, Urawa; Yoshihisa Mineura, Tokyo, both of Japan

[73] Assignee: Lintec Corporation, Japan

[21] Appl. No.: 08/847,560

[22] Filed: Apr. 24, 1997

[30] Foreign Application Priority Data

Apr. 26, 1996 [JP] Japan .................................. 8-107328

[51] Int. Cl.$^6$ ..................................... C08G 18/62
[52] U.S. Cl. ............................ 522/95; 522/96; 522/117; 428/343; 428/345; 428/355 EN; 428/355 N; 528/75
[58] Field of Search ................................ 522/95, 96, 117; 428/343, 345, 355 EN, 355 N; 528/75

[56] References Cited

U.S. PATENT DOCUMENTS 5,747,551   5/1998   Lewandawski et al. .................. 522/95

*Primary Examiner*—Rachel Gorr
*Attorney, Agent, or Firm*—Webb Ziesenheim Logsdon Orkin & Hanson, P.C.

[57] ABSTRACT

A pressure sensitive adhesive composition is disclosed which comprises an acrylic copolymer (A), an energy beam polymerizable urethane acrylate oligomer (B) and an energy beam polymerizable compound having one acryloyl group or methacryloyl group in each molecule thereof (C). This composition is preferred to further contain a plasticizer (D), a crosslinking agent (E) and/or a photopolymerization initiator (F) according to necessity. The pressure sensitive adhesive composition has satisfactory pressure sensitive adherence and initial adhesion before the irradiation with energy beam and the adhesive strength thereof is sharply reduced with maintaining the rubber elasticity after the irradiation with energy beam. Further, the pressure sensitive adhesive composition ensures excellent chip alignability in the expanding step subsequent to dicing. The pressure sensitive adhesive composition provides a pressure sensitive adhesive sheet, especially, a wafer processing pressure sensitive adhesive sheet or a surface protective pressure sensitive adhesive sheet.

15 Claims, 3 Drawing Sheets

PRESSURE SENSITIVE ADHESIVE COMPOSITION AND SHEET HAVING LAYER THEREOF

FIELD OF THE INVENTION

The present invention relates to a pressure sensitive adhesive composition and a pressure sensitive adhesive sheet having a layer thereof. More particularly, the present invention is concerned with a pressure sensitive adhesive sheet which exhibits satisfactory rubber elasticity and has satisfactory pressure sensitive adherence and initial adhesion to an adherend before the irradiation with energy beam but whose adhesive strength to the adherend is sharply reduced after the irradiation with the energy beam while maintaining the rubber elasticity, so that the adherend can be removed without having the adhesive remaining thereon. The pressure sensitive adhesive sheet ensures excellent chip alignability after the cutting and separation (dicing) of a wafer into small element pieces (chips). Furthermore, the present invention is concerned with the pressure sensitive adhesive composition which can provide the above pressure sensitive adhesive sheet.

BACKGROUND OF THE INVENTION

A semiconductor wafer of, for example, silicon or gallium arsenide is produced in the form of a large diameter. This wafer is cut and separated (diced) into small element chips and is subjected to a subsequent mounting step in which the chips are mounted on lead frames. In this process, the semiconductor wafer undergoes dicing, cleaning, drying, expanding and pickup steps in the state of being attached to a pressure sensitive adhesive sheet, and transferred to the subsequent mounting step.

Adhesive sheets which are intended for use in the processing steps of wafers, from the dicing step up to the pickup step, are desired to have an adhesive force sufficient to retain the wafer and/or chips thereon during the dicing step, but in the pickup step, they are desired to only retain an adhesive force of such an extent that no adhesive remains on the picked-up wafer and/or chips.

In the efforts for obtaining such a desired pressure sensitive adhesive sheet, Japanese Patent Laid-open Publication Nos. 60(1985)-196956 and 60(1985)-223139 proposed pressure sensitive adhesive sheets each comprising a substrate coated with a pressure sensitive adhesive comprising a low molecular weight compound having at least two photopolymerizable carbon-carbon double bonds in each molecule thereof which can be converted to a three-dimensional netted structure by light irradiation. These proposals are based on the concept that, in a pressure sensitive adhesive tape comprising a radiation transmittable substrate and, applied thereon, a radiation curable pressure sensitive adhesive, the radiation curable compound contained in the pressure sensitive adhesive is cured by radiation irradiation so that the pressure sensitive adhesive comes to have a three-dimensional netted structure to thereby conspicuously lower the fluidity thereof. However, in the pressure sensitive adhesive sheets described in the above publications, the curing reaction is likely to cause the pressure sensitive adhesive layer to suffer from loss of the rubber elasticity, so that satisfactory extension cannot be attained in the expansion of the sheet. Therefore, the spacings between wafer chips neighboring each other are not satisfactory and not uniform to thereby cause operation error at the pickup step.

Japanese Patent Laid-open Publication No. 5(1993)-214298 teaches a pressure sensitive adhesive sheet provided with a pressure sensitive adhesive layer having, added thereto, a vinyl ether compound of relatively low molecular weight for maintaining the rubber elasticity of the adhesive layer and an unsaturated oligomer of relatively low molecular weight for rendering the adhesive layer curable by radiation irradiation. Further, Japanese Patent Laid-open Publication No. 6(1994)-49420 discloses a pressure sensitive adhesive sheet provided with a pressure sensitive adhesive layer having, added thereto, a polyfunctional urethane acrylate oligomer and a plasticizer such as a polyester compound. However, when the amount of added low molecular weight component or plasticizer is too large, this pressure sensitive adhesive suffers from lowering of its initial adhesive strength, so that the drawback would be encountered that the low molecular weight component or plasticizer remains on the back of the semiconductor wafer chips. On the other hand, when the amount of added low molecular weight component or plasticizer is too small, the drawback would be encountered that the reduction of the adhesive strength is unsatisfactory or the rubber elasticity cannot be obtained upon radiation irradiation Therefore, the control of adherent properties has been very difficult before and after the radiation irradiation.

The present invention provides a pressure sensitive adhesive sheet which has satisfactory pressure sensitive adherence and initial adhesion before the irradiation with energy beam but whose adhesive strength is sharply reduced after the irradiation with energy beam with maintaining the rubber elasticity, this pressure sensitive adhesive sheet ensuring excellent chip alignability in the expanding step subsequent to dicing. The present invention further provides a pressure sensitive adhesive composition which can form the above pressure sensitive adhesive sheet.

SUMMARY OF THE INVENTION

The pressure sensitive adhesive composition of the present invention comprises:
an acrylic copolymer (A),
an energy beam polymerizable urethane acrylate oligomer (B) and
an energy beam polymerizable compound having one acryloyl group or methacryloyl group in each molecule thereof (C).

The pressure sensitive adhesive composition of the present invention is preferred to further contain a plasticizer (D).

The pressure sensitive adhesive composition of the present invention is preferred to further contain a crosslinking agent (E).

The pressure sensitive adhesive composition of the present invention is preferred to further contain a photopolymerization initiator (F).

The pressure sensitive adhesive sheet of the present invention comprises a substrate and, formed thereon, a pressure sensitive adhesive layer composed of the above pressure sensitive adhesive composition.

DETAILED DESCRIPTION OF THE INVENTION

Figure 1:
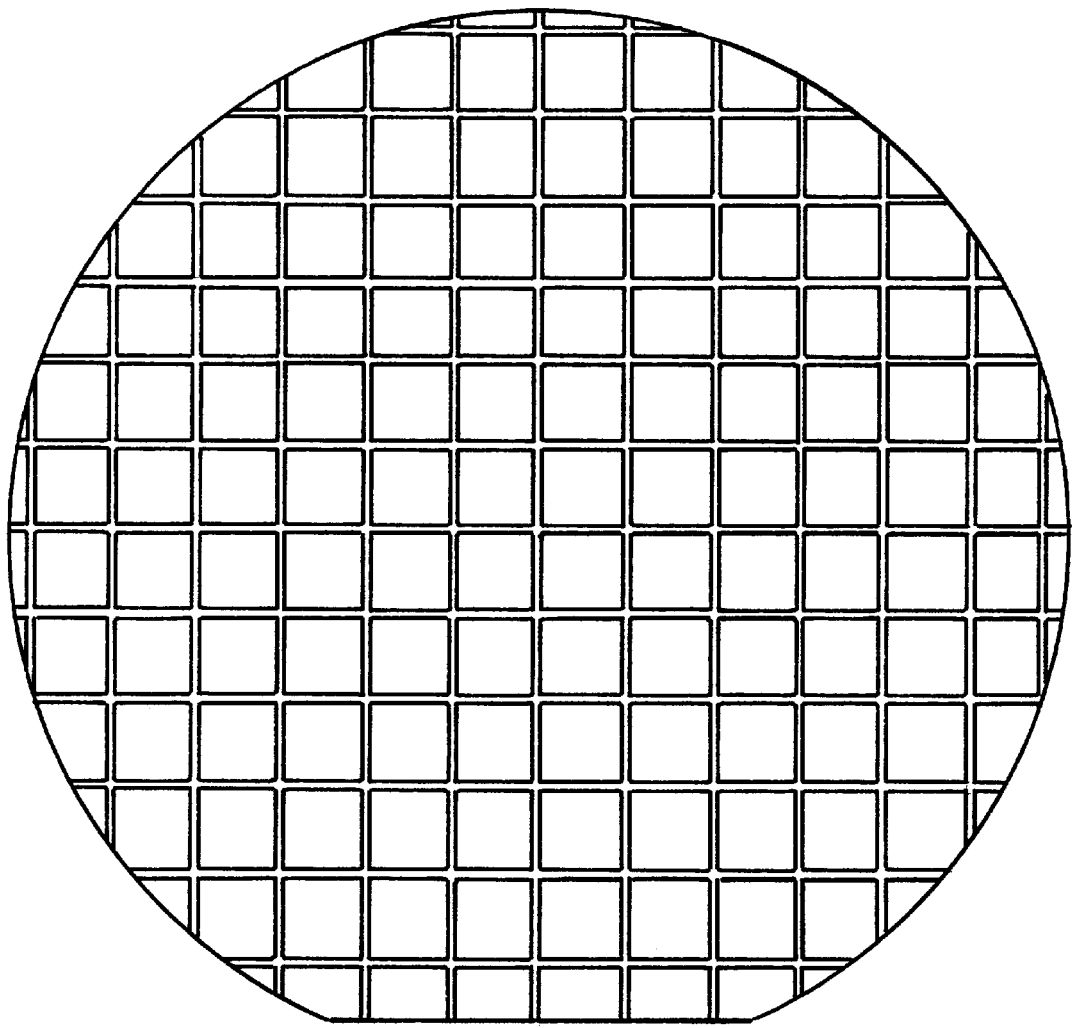
FIG. 1 is a view showing the arrangement of chips realized at the expansion made with the use of the pressure sensitive adhesive sheet of Example 1.

The pressure sensitive adhesive composition and pressure sensitive adhesive sheet according to the present invention will be described in detail below.

Pressure Sensitive Adhesive Composition

The pressure sensitive adhesive composition of the present invention comprises:

an acrylic copolymer (A), an energy beam polymerizable urethane acrylate oligomer (B) and an energy beam polymerizable compound having one acryloyl group or methacryloyl group in each molecule thereof (C).

The pressure sensitive adhesive composition of the present invention may further contain a plasticizer (D), a crosslinking agent (E) and/or a photopolymerization initiator (F) according to necessity.

Acrylic Copolymer (A)

Those having commonly been used in pressure sensitive adhesives can be used as the acrylic copolymer (A) in the present invention. Specifically, the acrylic copolymer (A) may be, for example, a (meth)acrylic ester copolymer whose main structural monomer units are formed from the (meth)acrylic ester or a mixture of the above copolymers.

An alkyl (meth)acrylate having an alkyl group of 1 to 18 carbon atoms is preferably used as the (meth)acrylic ester. Besides the above monomers, a comonomer such as vinyl acetate, styrene or vinyl chloride may be used in the copolymerization for obtaining the above copolymer.

The acrylic copolymer (A) has a molecular weight of at least 200,000, preferably, from 400,000 to 2,000,000 and, still preferably, from 1,200,000 to 1,700,000. The acrylic copolymer (A) generally has a glass transition temperature of not higher than −10° C., preferably, about −70 to −20° C. The acrylic copolymer (A) exhibits adherence at room temperature (23° C.).

The above acrylic copolymers may be used either individually or in combination.

Energy Beam Polymerizable Urethane Acrylate Oligomer (B)

The energy beam polymerizable urethane acrylate oligomer (B) for use in the present invention is a urethane acrylate oligomer having energy beam polymerizable double bonds. For example, it is obtained by reacting a polyol compound of the polyester or polyether type with a polyvalent isocyanate compound such as 2,4-tolylene diisocyanate, 2,6-tolylene diisocyanate, 1,3-xylylene diisocyanate, 1,4-xylylene diisocyanate or diphenylmethane-4,4'-diisocyanate to thereby obtain an isocyanate terminated urethane prepolymer and reacting the obtained isocyanate terminated urethane prepolymer with an acrylate or methacrylate having a hydroxyl group such as 2-hydroxyethyl acrylate, 2-hydroxyethyl methacrylate, 2-hydroxypropyl acrylate, 2-hydroxypropyl methacrylate, polyethylene glycol acrylate or polyethylene glycol methacrylate.

The energy beam polymerizable urethane acrylate oligomer (B) has a molecular weight of at least 500, preferably, 3000 to 30,000 and, still preferably, 5000 to 20,000. The energy beam polymerizable urethane acrylate oligomer (B) generally contains 2 to 10, preferably, 2 to 6 and, still preferably, 2 to 4 energy beam polymerizable unsaturated groups in each molecule thereof.

Energy Beam Polymerizable Compound (C)

The energy beam polymerizable compound (C) for use in the present invention is a monomer or oligomer having one acryloyl group or methacryloyl group in each molecule thereof. Specific examples thereof include methyl (meth)acrylate, ethyl (meth)acrylate, benzyl (meth)acrylate, cyclohexyl (meth)acrylate, butoxyethyl (meth)acrylate, N,N-dimethylaminoethyl (meth)acrylate, 2-ethylhexyl (meth)acrylate, 2-hydroxyethyl (meth)acrylate, methoxyethylene glycol (meth)acrylate, glycidyl (meth)acrylate, isodecyl (meth)acrylate, isooctyl (meth)acrylate, lauryl (meth)acrylate, tetrahydrofurfuryl (meth)acrylate, methylol(meth)acrylamide, (meth)acrylamide, polystyrylethyl (meth)acrylate and morpholyl (meth)acrylate.

Although the proportions of added components (A), (B) and (C) in the pressure sensitive adhesive composition can arbitrarily be set, it is preferred that, in terms of the parts by weight of solid contents, the component (B) be used in an amount of, for example, 10 to 300 parts by weight, especially, 60 to 200 parts by weight and, still especially, 90 to 150 parts by weight per 100 parts by weight of the component (A) and that the component (C) be used in an amount of, for example, 10 to 300 parts by weight, especially, 30 to 150 parts by weight and, still especially, 60 to 120 parts by weight per 100 parts by weight of the component (A).

The adhesive strength of the above pressure sensitive adhesive composition of the present invention is sharply reduced by the irradiation with energy beam with maintaining the rubber elasticity. Suitable examples of the energy beams include ultraviolet rays and electron beams. The energy beam dosage is varied depending on the type of applied energy beam. For example, when ultraviolet rays are used, the dosage thereof is preferred to range from about 40 to 200 W/cm. When electron beams are used, the dosage thereof is preferred to range from about 10 to 1000 krad. This energy beam irradiation realizes a marked reduction of the adhesive strength of the composition of the present invention. For example, whereas the adhesive strength to a specular surface of semiconductor wafer ranges from about 100 to 2000 g/25 mm before the energy beam irradiation, control can be effected so that the adhesive strength after the energy beam irradiation is about 1 to 50% of that before the energy beam irradiation.

On the other hand, the elasticity of the composition ranges from about $10^5$ to $10^6$ dyne/cm$^2$ before the energy beam irradiation and ranges from about $10^6$ to $10^8$ dyne/cm$^2$ after the energy beam irradiation. Thus, the rubber elasticity of the composition is maintained after the energy beam irradiation.

Plasticizer (D)

In the present invention, it is preferred that the plasticizer (D) be added to the components (A), (B) and (C). This plasticizer is a compound which does not contain any photopolymerizable unsaturated bond in its molecule and which lowers the elasticity of the cured adhesive composition. Examples of suitable plasticizers include:

phthalic ester plasticizers such as dimethyl phthalate, diethyl phthalate, di-2-ethylhexyl phthalate, di-n-octyl phthalate and dinonyl phthalate;

dibasic fatty acid ester plasticizers such as diisodecyl succinate, dioctyl adipate and dioctyl sebacate;

glycol ester plasticizers such as diethylene glycol dibenzoate and dipentaerythritol hexaesters;

polyether-ester plasticizers such as polyethylene glycol di-2-ethylhexoate and polyethylene glycol di-2-stearate;

fatty acid ester plasticizers such as butyl oleate and methyl acetylricinolate;

phosphoric ester plasticizers such as trioctyl phosphate and triphenyl phosphate;

epoxidized plasticizers such as epoxidized soybean oil, epoxidized linseed oil and butyl epoxystearate;

polyester plasticizers such as polypropylene adipate and polypropylene sebacate; and other plasticizers such as trioctyl trimellitate and tetraoctyl pyromellitate.

Of these plasticizers, the polyether-ester plasticizers are preferred.

It is preferred that each of the above plasticizers (D) be used in an amount of 1 to 150 parts by weight, especially, 5 to 50 parts by weight per 100 parts by weight of the component (A).

Crosslinking Agent (E)

Further, the crosslinking agent (E) can be added to the pressure sensitive adhesive composition of the present invention according to necessity. Examples of suitable crosslinking agents include:

polyvalent polyisocyanate compounds and trimers thereof;

isocyanate terminated urethane prepolymers obtained by reacting the above polyisocyanate compounds with polyol compounds; and blocked polyisocyanate compounds obtained by terminating the above polyisocyanate compounds, polyisocyanate compound trimers and isocyanate terminated urethane prepolymers with phenol, oximes or the like.

Specific examples of suitable polyvalent isocyanate compounds include 2,4-tolylene diisocyanate, 2,6-tolylene diisocyanate, 1,3-xylylene diisocyanate, 1,4-xylylene diisocyanate, diphenylmethane-4,4'-diisocyanate, diphenylmethane-2,4'-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate and lysine isocyanate.

It is preferred that each of the above crosslinking agents (E) be added in an amount of 0.1 to 10 parts by weight, especially, 1 to 10 parts by weight per 100 parts by weight of the component (A).

Photopolymerization Initiator (F)

When ultraviolet rays are employed as the energy beam, the polymerization/curing time and the ultraviolet ray dosage can be reduced by mixing a photopolymerization initiator (F) in the above composition of the present invention.

Specific examples of suitable photopolymerization initiators (F) include benzophenone, acetophenone, benzoin, benzoin methyl ether, benzoin ethyl ether, benzoin isopropyl ether, benzoin isobutyl ether, benzoin benzoic acid, methyl benzoin benzoate, benzoin dimethyl ketal, 2,4-diethylthioxanthone, 1-hydroxycyclohexyl phenyl ketone, benzyl diphenyl sulfide, tetramethylthiuram monosulfide, azobisisobutyronitrile, benzil, dibenzyl, diacetyl and β-chloroanthraquinone. It is preferred that the photopolymerization initiator (F) be used in an amount ranging from 0.1 to 20 parts by weight, especially, from 2 to 10 parts by weight per 100 parts by weight of the sum of the components (B) and (C).

The pressure sensitive adhesive composition of the present invention can be obtained by blending together the above acrylic copolymer (A), energy beam polymerizable urethane acrylate oligomer (B) and energy beam polymerizable compound (C), preferably, along with the plasticizer (D), further along with the optionally added crosslinking agent (E) and photopolymerization initiator (F) according to the conventional technique.

The pressure sensitive adhesive composition of the present invention exhibits satisfactory rubber elasticity and has satisfactory pressure sensitive adherence and initial adhesion to an adherend before the irradiation with energy beam. Upon the energy beam irradiation, however, the adhesive strength to the adherend is sharply reduced with maintaining the rubber elasticity, so that the adhesive composition can be removed from the adherend without residue remaining on the adherend.

Therefore, the pressure sensitive adhesive composition of the present invention is suitable for use in applications in which peeling is effected after sticking.

Pressure Sensitive Adhesive Sheet

The pressure sensitive adhesive sheet of the present invention comprises a substrate and, formed thereon, a pressure sensitive adhesive layer of the above pressure sensitive adhesive composition. The pressure sensitive adhesive sheet of the present invention can be obtained by coating a variable substrate in appropriate thickness with the above pressure sensitive adhesive composition according to the conventional technique employing a comma coater, gravure coater, die coater, reverse coater or the like and drying the composition to thereby form a pressure sensitive adhesive layer on the substrate. When considered necessary, a release sheet is applied onto the pressure sensitive adhesive layer.

Although varied depending on the use, the thickness of the pressure sensitive adhesive layer generally ranges from about 1 to 100 μm, preferably, from about 5 to 50 μm and, still preferably, from about 10 to 30 μm.

On the other hand, the thickness of the substrate generally ranges from about 10 to 300 μm, preferably, from about 20 to 200 μm and, still preferably, from about 50 to 150 μm.

The configuration of the pressure sensitive adhesive sheet of the present invention is not limited and the sheet may have the form of, for example, a tape or a label.

It is preferred that a synthetic resin film which is extendable in not only the direction of the length but also the direction of the width be used as the substrate.

When the pressure sensitive adhesive sheet of the present invention having been stuck to an adherend is irradiated with energy beam, the adhesive strength thereof is sharply reduced. Thus, this sheet can be removed from the adherend without causing adhesive residue to remain on the adherend.

Therefore, the pressure sensitive adhesive sheet of the present invention is most suitable for use in applications in which peeling is effected after sticking. For example, it is used as a semiconductor processing or surface protective pressure sensitive adhesive sheet.

The surface protective pressure sensitive adhesive sheet is stuck onto the surface of, for example, a decorative laminate, a glass plate, a metal plate or a plastic plate and protects the same from soiling or scratching during the transit or processing. When the protection is no longer needed, the surface protective pressure sensitive adhesive sheet can easily be peeled off by irradiating it with energy beam.

The semiconductor processing pressure sensitive adhesive sheet is employed at the time of, for example, polishing the back of a wafer or wafer dicing.

A multiplicity of circuits are formed on a surface of a semiconductor wafer, and semiconductor chips are produced by conducting cutting and separation (dicing) of the semiconductor wafer for each individual circuit. If the thickness of the wafer is irregular or an oxide layer has been formed on the back of the wafer, the obtained chips suffer from performance irregularity. Thus, the back of the wafer is polished after the completion of the wafer processing. However, this may encounter damaging of circuits by polishing debris. In this instance, the sticking of the pressure sensitive adhesive sheet of the present invention to a frontal face of the wafer enables preventing the damaging of circuits. Moreover, the pressure sensitive adhesive sheet can easily be peeled off by irradiating it with energy beam without causing adhesive residue to remain on the wafer, so that the wafer is not soiled.

Likewise, the wafer dicing may encounter damaging of circuits by cutting debris. In this instance as well, the circuits can be protected by the pressure sensitive adhesive sheet of the present invention. Further, the pressure sensitive adhesive sheet of the present invention can be stuck to the back of the wafer for fixing of the wafer so that the wafer is stably held at the time of dicing. This pressure sensitive adhesive sheet of the present invention can hold the wafer with satisfactory adhesive strength before the irradiation with energy beam and has a sharp reduction of the adhesive strength upon the irradiation with energy beam after the dicing, so that the semiconductor chips can easily be picked up without suffering from soiling by the adhesive. Further, the adhesive layer maintains the rubber elasticity even after the energy beam irradiation, so that the entire sheet undergoes satisfactorily uniform extension in the expanding step. Accordingly, the spacings between chips neighboring each other are satisfactorily large to thereby further facilitate chip pickup operation.

The substrate for use in the pressure sensitive adhesive sheet of the present invention is not particularly limited. However, when ultraviolet rays are used as the energy beam, it is, for example, selected from among transparent films such as polyethylene, polypropylene, polybutene, polybutadiene, polymethylpentene, polyvinyl chloride, vinyl chloride copolymer, polyethylene terephthalate, polybutylene terephthalate, polyurethane, ethylene/vinyl acetate copolymer, ionomer resin, ethylene/(meth)acrylic acid copolymer, ethylene/(meth)acrylic acid ester copolymer, polystyrene and polycarbonate films which may be noncrosslinked or crosslinked and laminates thereof.

When electron beams are used as the energy beam, it is not necessary for the substrate to be transparent. Thus, each of not only the aforementioned transparent films but also opaque films obtained by coloring them and fluororesin films can be used as the substrate.

Moreover, the above pressure sensitive adhesive layer can contain compounds disclosed in Japanese Patent Laid-open Publication No. 62(1987)-153377 which take on color upon energy beam irradiation or can contain powdery energy beam scattering inorganic compounds disclosed in Japanese Patent Laid-open Publication No. 62(1987)-153375.

Furthermore, an antistatic agent can be added to the above pressure sensitive adhesive layer. The addition of the antistatic agent suppresses the generation of static electricity at the expanding or pickup step, so that the chip reliability is enhanced. Examples of suitable antistatic agents include generally known surface activators such as anionic, cationic, nonionic and amphoteric activators and powdery materials such as powdery carbon black, silver, nickel, antimony doped tin oxide and tin doped indium oxide. It is preferred that the antistatic agent be used in an amount ranging from 0 to 50% by weight, especially, from 0 to 30% by weight in the pressure sensitive adhesive layer.

In the present invention, the substrate may have abrasive grains dispersed therein as disclosed in Japanese Patent Laid-open Publication Nos. 63(1988)-205382 and 63(1988)-205383.

The pressure sensitive adhesive sheet of the present invention has a sharp reduction of the adhesive strength upon the irradiation with energy beam, so that the wafer chips can easily be picked up from the adhesive sheet. Further, the adhesive layer maintains a significant rubber elasticity even after the energy beam irradiation, so that desired chip spacings can easily be obtained at the expanding step and no chip dislocation occurs to thereby ensure stable chip pickup operation.

EFFECT OF THE INVENTION

As apparent from the foregoing, the pressure sensitive adhesive composition of the present invention exhibits satisfactory rubber elasticity and has satisfactory pressure sensitive adherence and initial adhesion to an adherend before the irradiation with energy beam. Upon the energy beam irradiation, however, the adhesive strength to the adherend is sharply reduced with maintaining the rubber elasticity, so that the adhesive composition can be removed from the adherend without residue remaining on the adherend. Further, this pressure sensitive adhesive composition ensures excellent chip alignability in the expanding step subsequent to energy beam irradiation. Therefore, the pressure sensitive adhesive composition of the present invention is suitable for use in applications in which peeling is effected after sticking, for example, advantageously used in a wafer processing or surface protective pressure sensitive adhesive sheet.

The present invention will further be illustrated below with reference to the following Examples which in no way limit the scope of the invention.

In the following Examples and Comparative Example, the "180° peeling adhesive strength" and "chip alignability" were evaluated in the following manners.

180° Peeling Adhesive Strength

The pressure sensitive adhesive sheet obtained in each of the following Examples and Comparative Example was stuck onto a specular face of a semiconductor wafer in 23° C./65% RH atmosphere by reciprocating a 2 kg rubber roller thereon, allowed to stand still for 30 min and peeled by means of a universal tensile tester (TENSILON/UTM-4-100 manufactured by Orientec Corporation) at a peeling speed of 300 mm/min to thereby determine a 180° peeling adhesive strength. Also, the pressure sensitive adhesive sheet was stuck and allowed to stand still under the same conditions, and was irradiated from the substrate sheet side at a line speed of 5 m/min with ultraviolet rays emitted from a high pressure mercury lamp (220 mW/cm$^2$) disposed at a distance of 10 cm from the sheet. Thereafter, the 180° peeling adhesive strength was measured in the same manner.

Chip Alignability

The pressure sensitive adhesive sheet was stuck onto a 6-inch silicon wafer and fixed by means of a ring frame, and a dicing was executed into 12 mm square chips with the use of a dicer (manufactured by DISCO Corporation).

In this dicing, blade 27HECC 2050 (manufactured by DISCO Corporation) was used and a cut into the sheet was 30 μm in depth. After the dicing, the specimen was irradiated with ultraviolet rays (220 mW/cm$^2$, 160 J/cm$^2$) from the back of the sheet, and the sheet was expanded by 17 mm with the use of expanding jig (CPS-100AS expanding unit manufactured by Nichiden Machinery Ltd.). At that time, the chip alignability was evaluated by visual inspection and by the measurement of chip spacings.

All the chip spacings were measured with respect to an arbitrary row of chips passing around the center of the silicon wafer in each of the direction of X-axis perpendicular to the orientation flat within the plane of silicon wafer and the direction of Y-axis parallel to the above orientation flat. The average (x) of the measurements was calculated as an indication of chip spacing and the standard deviation ($\sigma_{n-1}$) thereof was calculated as an indication of chip alignability. The smaller the standard deviation, the smaller the chip spacing irregularity and the better the chip alignability to thereby avoid operation error at the time of pickup.

The following acrylic copolymer (A), energy beam polymerizable urethane acrylate oligomer (B), energy beam polymerizable compound (C), plasticizer (D), crosslinking agent (E) and photopolymerization initiator (F) were employed in the Examples.

Acrylic Copolymer (A)
(A): copolymer of butyl acrylate and 2-hyciroxyethyl acrylate having a molecular weight of 15×10$^5$;

Energy Beam Polymerizable Urethane Acrylate Oligomer (B):
(B) having a molecular weight of 10,000 and three functional groups;

Energy Beam Polymerizable compound (C)
(C): tetrahydrofurfuryl acrylate having a molecular weight of 270 and one functional group;

Plasticizer (D)
(D): ether ester plasticizer having a molecular weight of 500;

Crosslinking Agent (E)
(E): polyisocyanate crosslinking agent; and

Photopolymerization Initiator (F)
(F): benzophenone type photopolymerization initiator.

EXAMPLE 1

100 parts by weight of component A, 120 parts by weight of component B, 80 parts by weight of component C, 3.5 parts by weight of component E and 9 parts by weight of component F were blended together, thereby obtaining a pressure sensitive adhesive composition.

An 80 μm thick polyvinyl chloride film was coated with the above pressure sensitive adhesive composition so that the coating thickness after drying would be 10 μm and dried at 100° C. for 1 min. Thus, a pressure sensitive adhesive sheet was obtained.

The "180° peeling adhesive strength" and "chip alignability" of the obtained pressure sensitive adhesive sheet were evaluated in the above manners. The results are given in Table 1. FIG. 1 is a view showing the arrangement of chips realized at the expansion made with the use of the obtained pressure sensitive adhesive sheet.

EXAMPLE 2

The same procedure as in Example 1 was repeated except that 15 parts by weight of component D was added to the composition. The results are given in Table 1.

Figure 2:
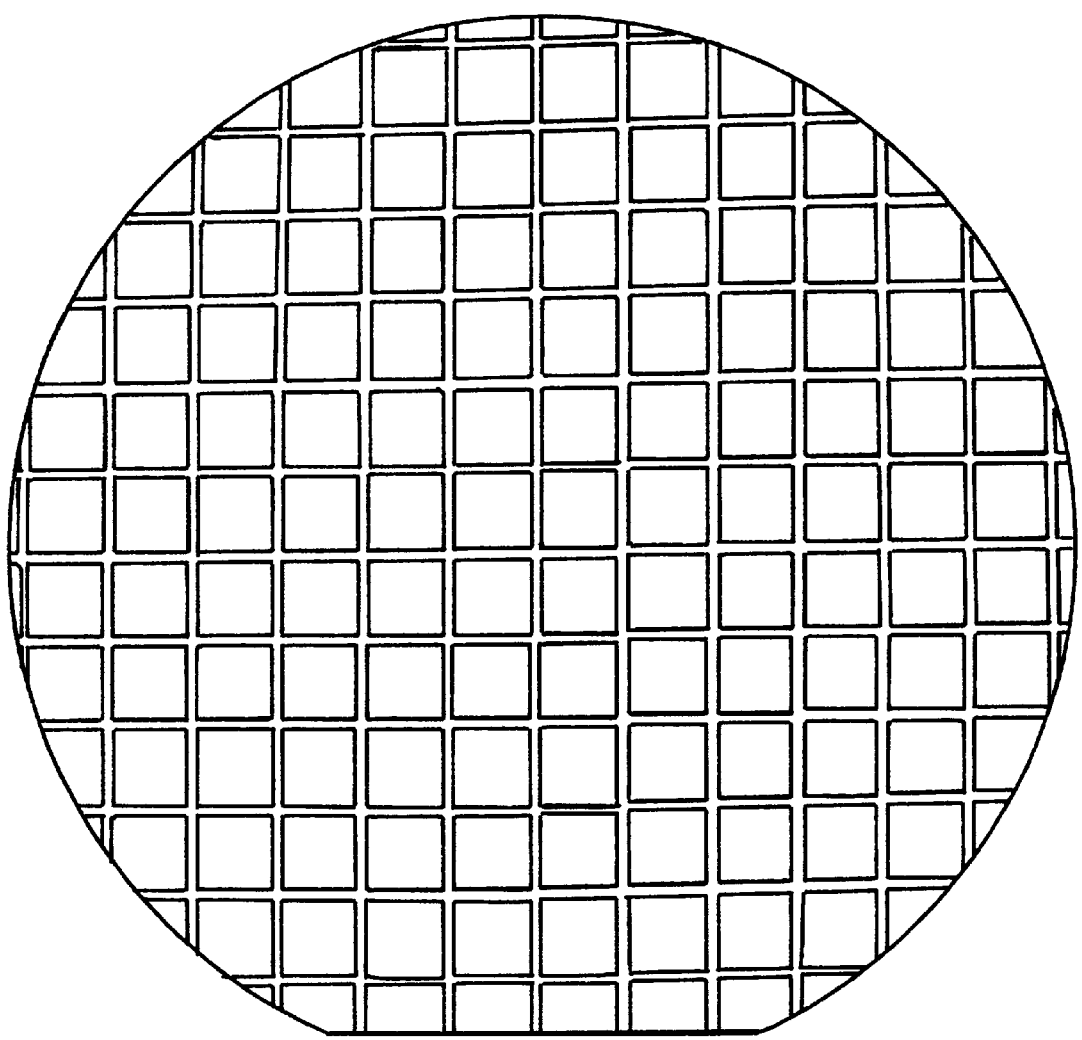
FIG. 2 is a view showing the arrangement of chips realized at the expansion made with the use of the pressure sensitive adhesive sheet of Example 2.

FIG. 2 is a view showing the arrangement of chips realized at the expansion made with the use of the obtained pressure sensitive adhesive sheet.

COMPARATIVE EXAMPLE 1

Without the use of component C, 100 parts by weight of component A, 120 parts by weight of component B, 3.5 parts by weight of component E and 5.5 parts by weight of component F were blended together, thereby obtaining a pressure sensitive adhesive composition.

Figure 3:
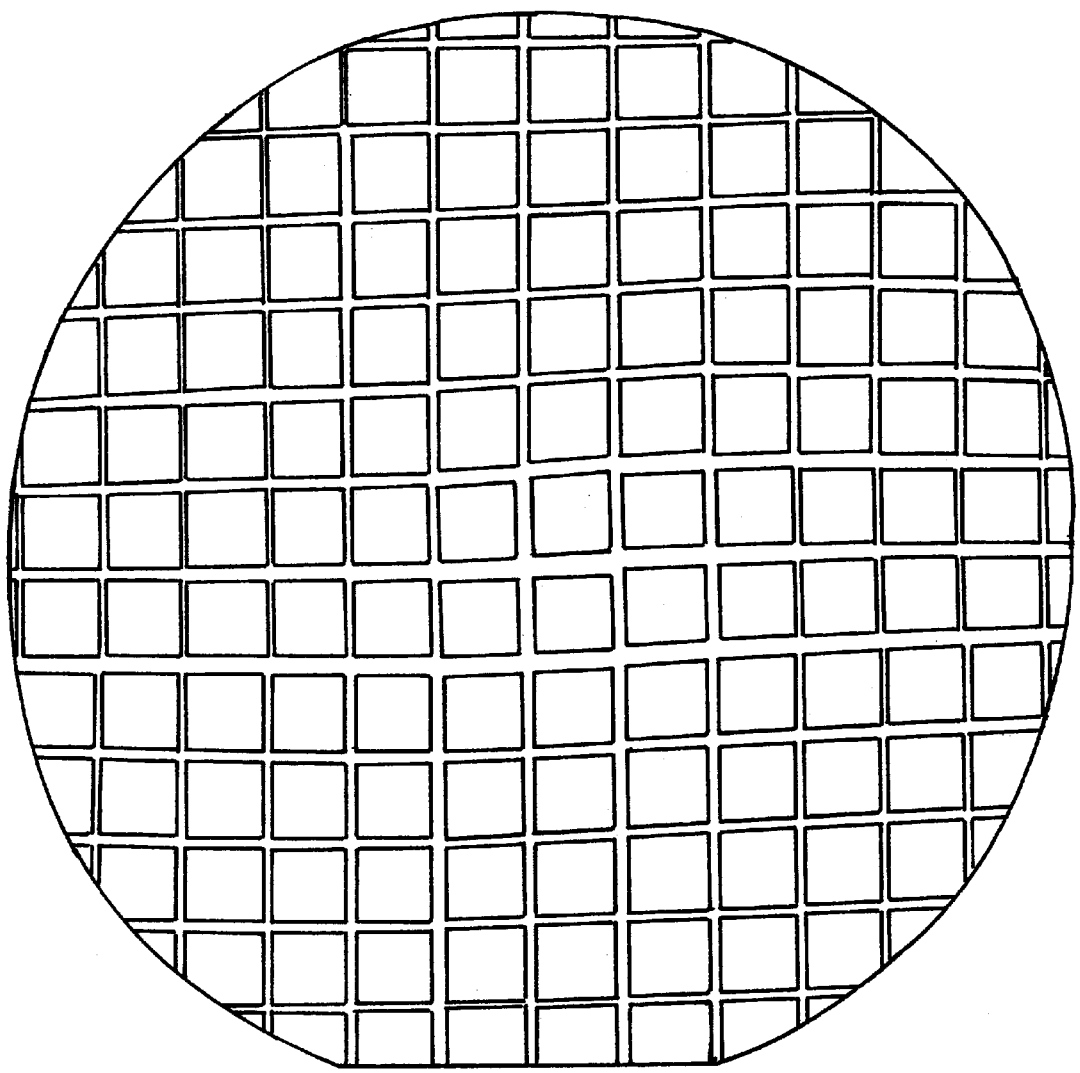
FIG. 3 is a view showing the arrangement of chips realized at the expansion made with the use of the pressure sensitive adhesive sheet of Comparative Example 1.

The same procedure as in Example 1 was repeated for the obtained pressure sensitive adhesive composition. The results are given in Table 1. FIG. 3 is a view showing the arrangement of chips realized at the expansion made with the use of the obtained pressure sensitive adhesive sheet.

As apparent from the obtained results, in Examples 1 and 2, not only was the adhesive strength sharply reduced after the irradiation with ultraviolet rays but also satisfactory chip spacings were obtained at the expansion of the pressure sensitive adhesive sheet with excellent chip alignability realized, as shown in Table 1 and FIGS. 1 and 2.

By contrast, in Comparative Example 1, chip spacings were nonuniform at the expansion of the pressure sensitive adhesive sheet although the adhesive strength was reduced upon the ultraviolet ray irradiation, so that operation error would be caused at the time of pickup, as shown in Table 1 and FIG. 3.

TABLE 1

| Pressure sensitive adhesive composition (parts by weight) | | | | | | Adhesive strength (g/25 mm) | | Arrangement of chip | Chip spacing, alignability (μm) | | | |
|---|---|---|---|---|---|---|---|---|---|---|---|---|
| | | | | | | Before irradiation | After irradiation | | X | | Y | |
| A | B | C | D | E | F | | | | X | $\sigma_{n-1}$ | X | $\sigma_{n-1}$ |
| Ex. 1: 100 | 120 | 80 | 0 | 3.5 | 9 | 170 | 55 | good | 490 | 60 | 455 | 55 |
| Ex. 2: 100 | 120 | 80 | 15 | 3.5 | 9 | 150 | 50 | good | 535 | 50 | 535 | 40 |
| Comp Ex. 1: 100 | 120 | 0 | 0 | 3.5 | 5.5 | 390 | 60 | poor | 495 | 300 | 445 | 190 |

What is claimed is:

1. A pressure sensitive adhesive composition, comprising:
   an acrylic copolymer (A) having a molecular weight of at least 200,000;
   an energy beam polymerizable urethane acrylate oligomer (B); and
   an energy beam polymerizable compound having one acryloyl group or methacryloyl group in each molecule thereof (C), wherein the composition is tacky before an energy beam irradiation and the composition becomes non-tacky after the energy beam irradiation.

2. The pressure sensitive adhesive composition as claimed in claim 1, which further comprises a plasticizer (D).

3. The pressure sensitive adhesive composition as claimed in claim 1, which further comprises a crosslinking agent (E).

4. The pressure sensitive adhesive composition as claimed in claim 1, which further comprises a photopolymerization initiator (F).

5. A pressure sensitive adhesive sheet, comprising:
   a substrate and, formed thereon, a pressure sensitive adhesive layer having a pressure sensitive adhesive composition, comprising:
   an acrylic copolymer (A) having a molecular weight of at least 200,000;
   an energy beam polymerizable urethane acrylate oligomer (B); and
   an energy polymerizable compound having one acryloyl group or methacryloyl group in each molecule thereof (C), wherein the pressure sensitive layer is tacky before an energy beam irradiation and the composition becomes non-tacky after the energy beam irradiation.

6. A pressure sensitive adhesive sheet according to claim 5 in which the pressure sensitive adhesive composition further comprises a plasticizer (D).

7. A pressure sensitive adhesive sheet according to claim 5 in which the pressure sensitive adhesive composition further comprises a crosslinking agent (E).

8. A pressure sensitive adhesive sheet according to claim 5 in which the pressure sensitive adhesive composition further comprises a photopolymerization initiator (F).

9. A pressure sensitive adhesive sheet according to claim 5 in which the pressure sensitive adhesive composition further comprises a plasticizer (D) and a crosslinking agent (E).

10. A pressure sensitive adhesive sheet according to claim 5 in which the pressure sensitive adhesive composition further comprises a plasticizer (D), a crosslinking agent (E) and a photopolymerization initiator (F).

11. The pressure sensitive adhesive composition as claimed in claim 2, which further comprises a crosslinking agent (E).

12. The pressure sensitive adhesive composition as claimed in claim 2, which further comprises a photopolymerization initiator (F).

13. The pressure sensitive adhesive composition as claimed in claim 3, which further comprises a photopolymerization initiator (F).

14. The pressure sensitive adhesive composition of claim 1, wherein the composition has an adhesive strength to a specular surface of semiconductor wafer ranging from 100 to 2000 g/25 mm before the energy beam irradiation, and wherein the adhesive strength is controllable, such that an adhesive strength after the energy beam irradiation is about 1 to 50% of said adhesive strength before the energy beam irradiation.

15. The pressure sensitive adhesive sheet as claimed in claim 5, wherein the adhesive layer has an adhesive strength to a specular surface of semiconductor wafer ranging from 100 to 2000 g/25 mm before the energy beam irradiation, and wherein the adhesive strength is controllable such that an adhesive strength after the energy beam irradiation is about 1 to 50% of said adhesive strength before the energy beam irradiation.

* * * * *

UNITED STATES PATENT AND TRADEMARK OFFICE
CERTIFICATE OF CORRECTION

PATENT NO. : 5,955,512
DATED : September 21, 1999
INVENTOR(S) : Hideki Numazawa et al.

It is certified that error appears in the above-identified patent and that said Letters Patent is hereby corrected as shown below:

Title Page, under [56] References Cited, U.S. PATENT DOCUMENTS, insert:
```
    --4,756,968    7/1988    Ebe et al.........428/343
      4,965,127   10/1990    Ebe et al.........428/343
      5,187,007    2/1993    Ebe et al.........428/343--.
```

Title Page, under [56] References Cited, FOREIGN PATENT DOCUMENTS, insert:
```
    --0157508   10/1985   Eur. Pat. Off.
      0311288    4/1989   Eur. Pat. Off.
      223139    11/1985   Japan
      205382     8/1988   Japan
      205383     8/1988   Japan
      1599281    9/1981   U.K.
      2216136   10/1989   U.K.
      2221470    2/1990   U.K.--.
```

Title Page, under [56] References Cited, OTHER DOCUMENTS, insert:
   --WPI Abstract Accession No. 83-823346/198347 and
     JP 580174475A, Oct. 13, 1983--.

Column 2 Line 21 after "irradiation" insert period --.--.

Column 9 Line 20 "($on_{-1}$)" should read --($\sigma_{n-1}$)--.

UNITED STATES PATENT AND TRADEMARK OFFICE
CERTIFICATE OF CORRECTION

PATENT NO. : 5,955,512
DATED : September 21, 1999
INVENTOR(S) : Hideki Numazawa et al.

It is certified that error appears in the above-identified patent and that said Letters Patent is hereby corrected as shown below:

Column 9 Line 31 "2-hyciroxyethyl" should read --2-hydroxyethyl--.

Signed and Sealed this

Thirteenth Day of June, 2000

*Attest:*

Q. TODD DICKINSON

*Attesting Officer*        *Director of Patents and Trademarks*